(12) United States Patent
Freundlich et al.

(10) Patent No.: US 7,162,012 B2
(45) Date of Patent: Jan. 9, 2007

(54) APPARATUS AND METHOD FOR TRANSITIONING BETWEEN TTY AND VOICE TRANSMISSION MODES

(75) Inventors: Glen George Freundlich, Broomfield, CO (US); Paul Roller Michaelis, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 395 days.

(21) Appl. No.: 10/406,337

(22) Filed: Apr. 3, 2003

(65) Prior Publication Data
US 2004/0196961 A1   Oct. 7, 2004

(51) Int. Cl.
*H04M 11/00*   (2006.01)
(52) U.S. Cl. ..................... 379/52; 379/93.08

(58) Field of Classification Search .............. 379/52, 379/93.08, 93.01, 90.01; 370/352
See application file for complete search history.

(56) References Cited

U.S. PATENT DOCUMENTS

| 5,905,476 A | 5/1999 | McLaughlin et al. |
| 6,061,431 A * | 5/2000 | Knappe et al. ............... 379/52 |
| 6,181,736 B1 | 1/2001 | McLaughlin et al. |
| 6,351,495 B1 | 2/2002 | Tarraf |
| 6,381,472 B1 * | 4/2002 | LaMedica et al. ............ 379/52 |
| 6,434,198 B1 | 8/2002 | Tarraf |
| 6,628,429 B1 * | 9/2003 | Razazian ................. 379/93.08 |
| 6,747,995 B1 * | 6/2004 | Pawlowski et al. ......... 370/352 |
| 6,961,320 B1 * | 11/2005 | Swaminathan et al. ....... 379/52 |
| 2003/0119518 A1 * | 6/2003 | Cleveland et al. .......... 455/560 |
| 2004/0008667 A1 * | 1/2004 | Michaelis .................. 370/352 |

* cited by examiner

*Primary Examiner*—Stella Woo
(74) *Attorney, Agent, or Firm*—John C. Moran

(57) ABSTRACT

According to an embodiment, both a first and second of audio information are buffered during transmission so that when a transition occurs between transmission types no information is lost.

48 Claims, 13 Drawing Sheets

APPARATUS AND METHOD FOR TRANSITIONING BETWEEN TTY AND VOICE TRANSMISSION MODES

TECHNICAL FIELD

This invention relates to telecommunication systems and methods in general, and in particular, to the control of telecommunication calls involving TTY transmissions.

BACKGROUND OF THE INVENTION

TTYs (also known as TDDs) are text terminals that people with hearing impairments use in order to communicate over telephone lines. There is no single TTY communication protocol. Three of the more commonly used protocols are the United States standard Baudot 45, the United Kingdom standard Baudot 50, and Turbo Code protocol. Unlike computer modems and fax machines, none of the three TTY protocols listed above have a "handshake" tone or a carrier tone. In other words, TTYs are silent when not transmitting. This assures that the transmission of a TTY is not interrupted for lack of a handshake tone or carrier tone. However, this means that there is no mechanism by which a telephony system can automatically identify a TTY use, much less the protocol being used, until after a user has begun typing.

A further complication is that nearly half of all TTY use is actually mixed-mode voice and TTY dialog. A common type of mixed-mode use is by individuals with moderate hearing impairments, who never the less are able to speak clearly. These people often prefer to receive information with their TTYs, and then, speak in response. Another common pattern is for individuals to alternate between TTY and voice on the same call, relying on voice for informal conversation and TTY for critical information such as credit card numbers and bank balances. (The need to intermix voice and TTY on the same call is a reason why a handshake-free, carrier-free modem protocol is used for TTY communication.)

In the United States, Section 508 of the Workforce Investment Act of 1998, as well as section 251(a)(2) and 255 of the Telecommunication Act of 1996, requires telephony systems to be TTY compatible. The Federal Communication Commission (FCC) requirement for system performance is that TTY character error rate (i.e., the percentage of transmitted TTY characters that are displayed improperly by the receiving device) must be 1% or less. When tones emitted by TTYs are transmitted via voice channels on VoIP systems, this FCC-mandated level of performance is virtually impossible to achieve. One problem is that some of the low-data-rate audio encoders commonly used in VoIP systems cannot encode TTY tones accurately. A problem that may be more difficult to solve is the one caused by packet loss. Illustratively, when using United States standard TTY protocol on a call in a VoIP system in which a TTY-compatible audio encoder is used (such as G.711) and with a 20 millisecond packet length, the 1% error rate required by the FCC is exceeded when the packet loss exceeds only 0.12%—a packet loss rate far lower than is normal in typical VoIP systems. A similar problem exists in cellular telephone transmissions. The problem is further complicated by the mixed-mode voice and TTY dialog.

In the prior art, it has been recognized that during packet transmission of TTY signals that the signals can be converted to a digital form and transmitted as digital information in a more reliable digital channel. U.S. Pat. No. 6,351,495 discloses a cellular transmission system where TTY audio signals are recognized and converted to digital information for transmission via the signal transmission portion of the cellular system. However, the system disclosed in U.S. Pat. No. 6,351,495 does not prevent the loss of either audio or TTY information during the transition from one transmission mode to the other transmission mode. Since nearly half of all TTY use is the mixed-mode voice and TTY dialog, this represents a serious problem in the prior art methods of transmitting TTY information over transmission systems that are based on packets. Also, in the prior art for VoIP systems, it is known to encode precision tones such as multi-frequency dial tones as digital information and transport this digital information to a destination point via a signaling channel that is distinct from the bearer channel used for encoded voice. One such VoIP system that transports multi-frequency dial tones in this manner is disclosed in U.S. patent application Ser. No. 09/18,909, entitled "Integration of Remote Access and Service", filed Nov. 22, 2000, and assigned to the same assignee as the present patent application. U.S. patent application Ser. No. 09/18,909 is hereby incorporated by reference.

SUMMARY OF THE INVENTION

This invention is directed to solving these and other problems and disadvantages of the prior art. According to an embodiment of the invention, both a first type and a second type of audio information are buffered during transmission so that when a transition occurs between transmission types no information is lost.

DETAILED DESCRIPTION

Figure 1:
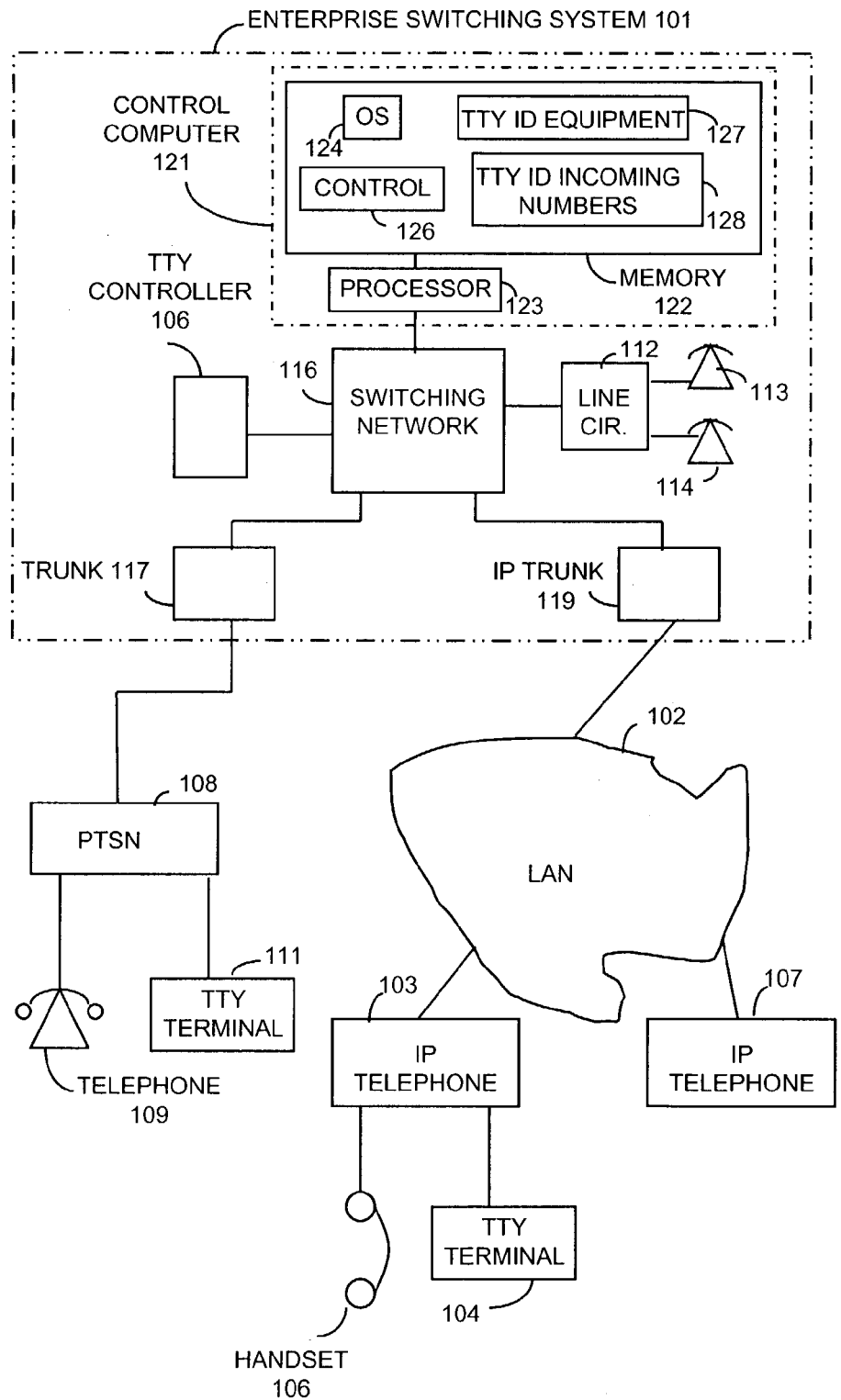
FIG. 1 illustrates an embodiment of a system for implementing the invention.

FIG. 1 illustrates an embodiment of a system for implementing the invention. Enterprise switching system 101 is providing service for directly connected telephones 113–114 via line circuit 112 and switching network 116. Further, enterprise switching system 101 is providing call operations for IP telephone 103 and IP telephone 107 via LAN 102, IP trunk 119, and switching network 116. One skilled in the art would readily realize that there would be more wired telephones and IP telephones in a system such as illustrated in FIG. 1. IP telephone 103 is illustrated as being able to communicate with a user via handset 106 and TTY terminal 104. IP telephone 103 also provides visual and other audio alerting means. A WAN or other digital networks well known to those skilled in the art may be used in place of LAN 102. Enterprise switching system 101 is controlled by control computer 121. The operations of processor 123 and memory 122 will be detailed later. TTY controller 106 illustrates an embodiment of a controller for implementing the invention.

Enterprise switching system 101 is interconnected to public telephone switching network 108 via trunk 117. For illustration purposes, public telephone switching network 108 is illustrated as being connected to only telephone 109 and TTY terminal 111. However, one skilled in the art would readily realize that there would be a multitude of telephone equipment connected to public telephone switching network 108.

One embodiment controls transitions between a plurality of types of audio information being received via an audio stream by continuously storing the audio stream; transmitting a present type of audio information from the audio stream; detecting a new type of audio information in the audio stream at a point in time; transmitting at an accelerated rate the new type of audio information from the stored audio stream until the detected time point is reached; and transmitting the new type of audio information from the audio stream after the detected time point is reached in the stored audio stream.

In some embodiments, voice information (also referred to as audio information) is transported via data switching components in a bearer channel using a data rate that is suitable for the transmission of voice information. For purposes of description, this use of the bearer channel for voice is termed a "voice channel". TTY information may be transported via a signal channel such as described in U.S. patent application Ser. No. 09/18,909 for transporting multifrequency dial tones or via the bearer channel as encoded audio information after this channel has been upgraded for TTY transmission using a special Quality of Service (QoS) that insures G.711 encoding and no packet loss. (The establishment of QoS is well known to those skilled in the art.) Regardless of which method is used to transport the TTY information, the resulting transport mechanism is termed a "TTY channel". Because the QoS requires more data switching resources than that required for voice transmission, once voice information is to transported, the bearer channel will be changed from QoS back to a data rate for voice information. In addition in one embodiment, if the TTY information is transported via a signal channel, the bearer channel may be deactivated so as to save data switching resources during the TTY transport time. The bearer channel will be re-activated upon the occurrence of voice information requiring transport.

Figure 2:
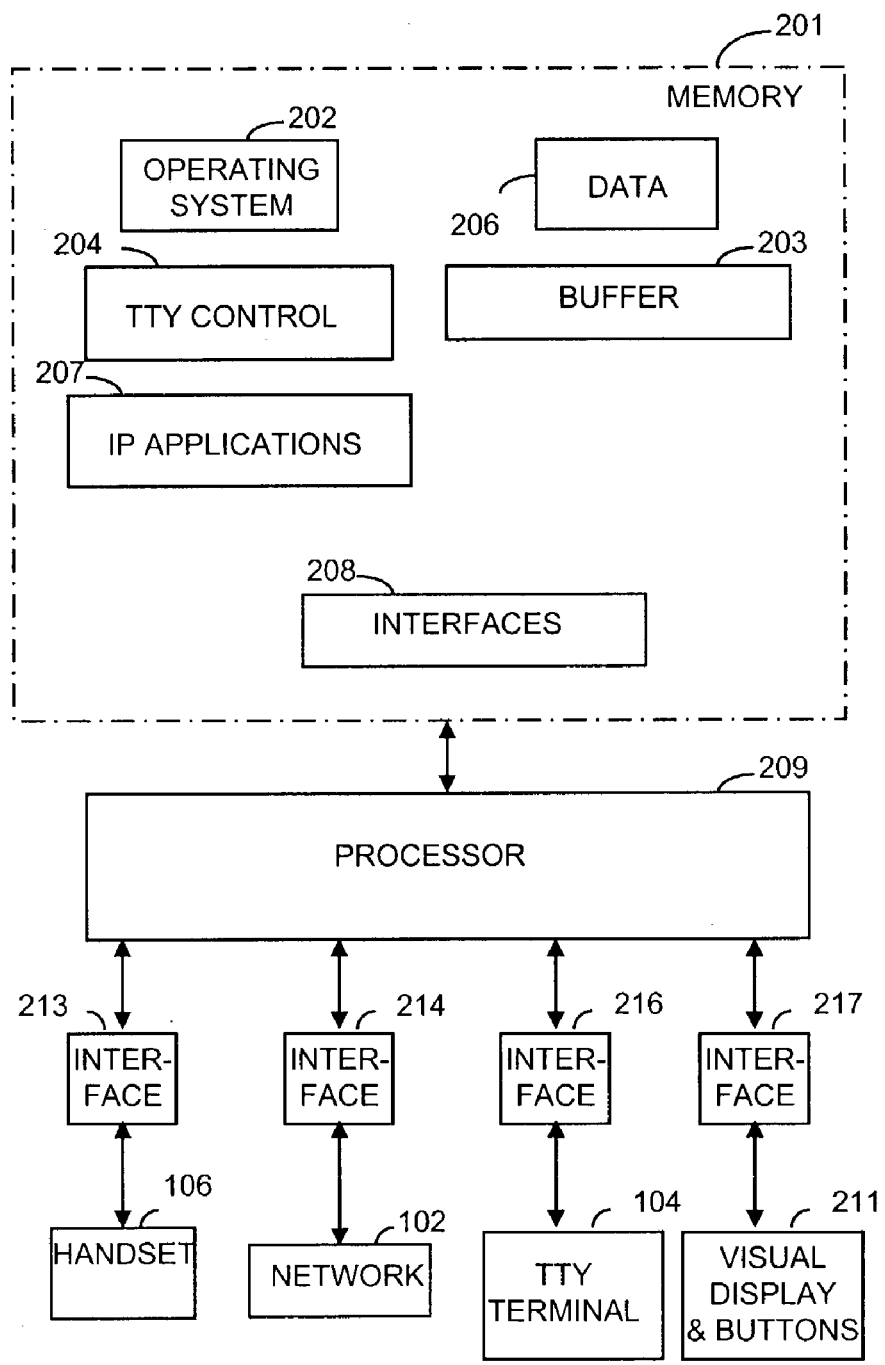
FIG. 2 illustrates, in block diagram form, an embodiment of an IP telephone for implementing the invention.

FIG. 2 illustrates, in block diagram form, an embodiment of an IP telephone such as IP telephone 103. Processor 209 controls the operations of the IP telephone by executing applications stored in memory 201 utilizing data also stored there. Processor 209 communicates information with handset 106 via interface 213 and communicates with LAN 102 via interface 214. Communication with TTY terminal is via interface 216. The IP telephone also has a visual display, buttons, and audio alerting means to provide signaling to the user. These visual display, buttons, etc. are illustrated as block 211. Processor 209 communicates with block 211 via interface 217.

To perform the operations of an IP telephone, processor 209 executes IP applications 207 stored in memory 201. The overall control of the IP telephone is provided by execution of operating system 202 by processor 209. Processor 209 utilizes data 206 for the storage of various types of parameters and information. The overall TTY operations are controlled by TTY control application 204 utilizing buffer 203. Buffer 203 is used to provided storage for audio or TTY information, and contents of buffer 203 are use during transitions between audio and TTY information. The operations using buffer 203 are described in detail with respect to FIGS. 3 and 4. To communicate with interfaces 213–217, processor 209 executes interfaces application 208.

Figure 3:
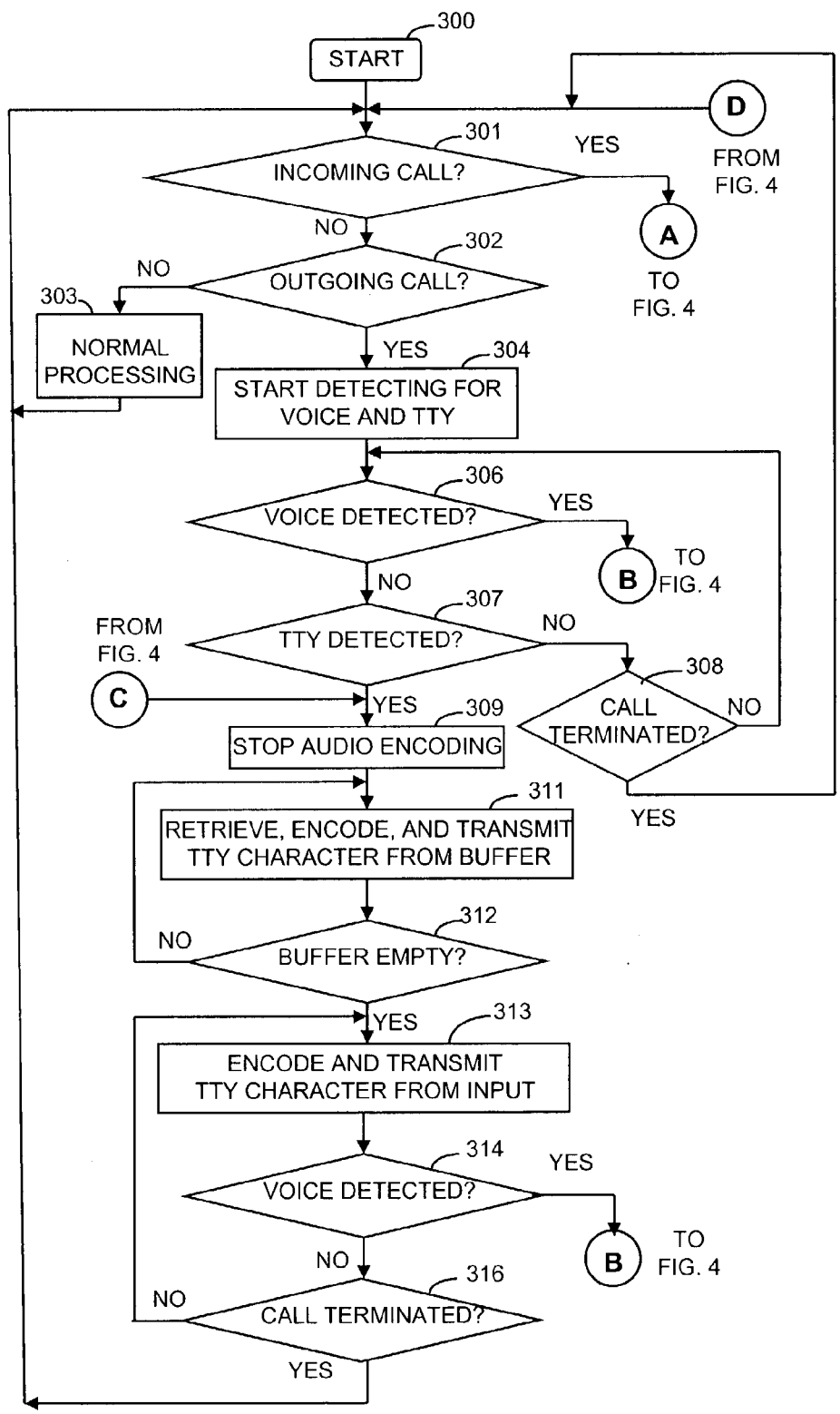
FIGS. 3 and 4 illustrate, in flowchart form, operations performed by an embodiment of the invention.
Figure 4:
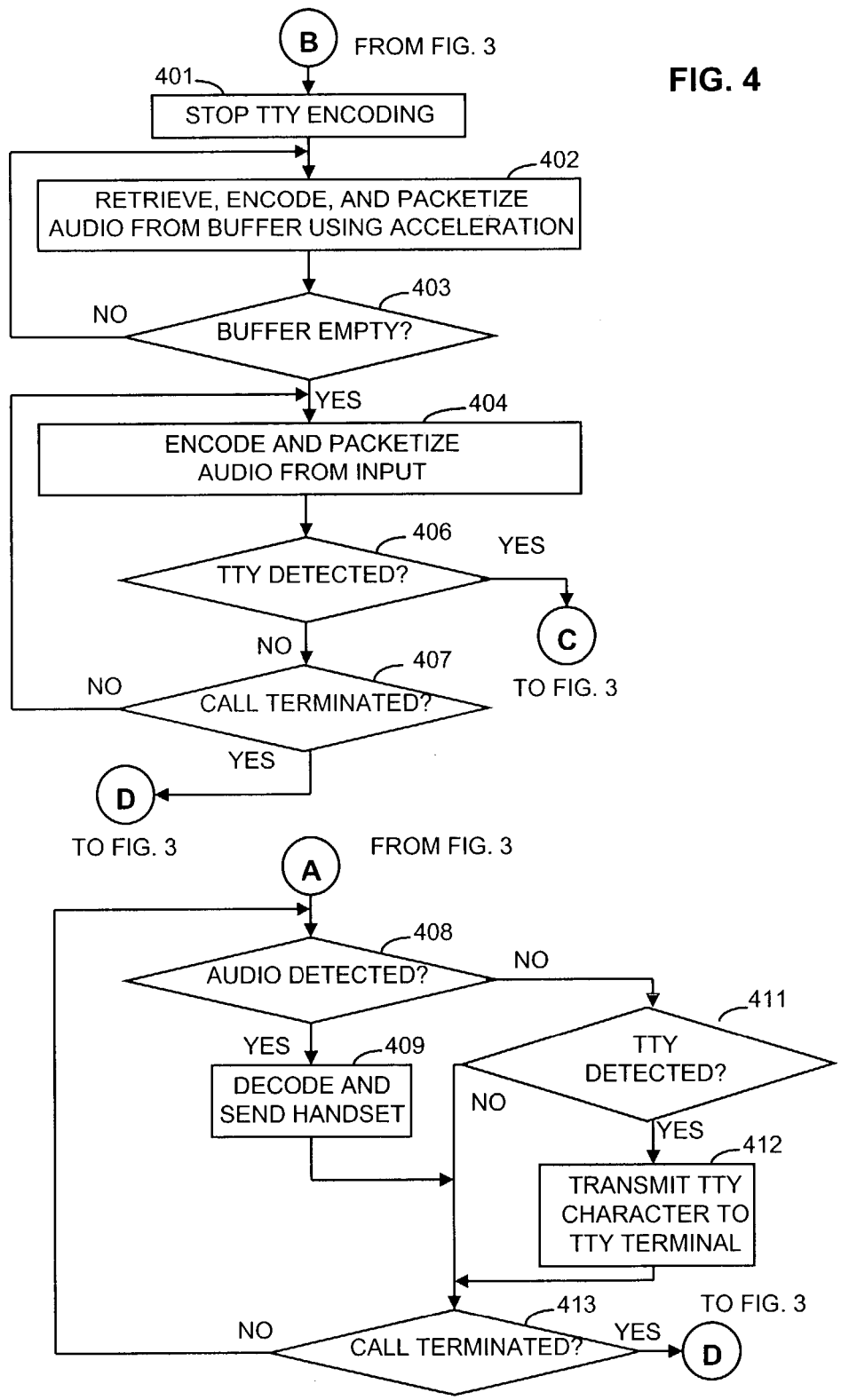

FIGS. 3 and 4 illustrate, in flowchart form, operations performed by embodiments of the invention. The operations illustrated in FIGS. 3 and 4 may be performed by TTY control application 204 in conjunction with IP operations application 209 of FIG. 2. Once started in block 300, decision blocks 301 and 302 determine if there is an active call. If there is no active call, block 303 performs normal processing before causing the check for an active call to be repeated. Decision block 301 determines if there is an incoming call. If the answer is yes, control is transferred to block 408 of FIG. 4. If the answer is no in decision block 301, decision block 302 determines if the IP telephone is placing an outgoing call. If the answer is no, control is transferred to block 303.

If the answer in decision block 302 is yes, block 304 starts the detection for voice and TTY information being transmitted on the outgoing call. Decision block 306 determines if audio activity other than TTY tones has been detected. (For simplicity in FIGS. 3 and 4 this is referred to as voice but those skilled in the art will readily realize that other audio information could also be present, e.g. music.) If the answer in decision block 306 is yes, control is transferred to block 401 of FIG. 4. If the answer in decision block 306 is no, decision block 307 determines if any TTY tones are being detected. If the answer is no, decision block 308 determines if the call has been terminated. If the call has not been terminated, decision block 308 returns control back to decision block 306. If the call has been terminated, decision block 308 transfers control back to decision block 301.

If the answer in decision block 307 is yes, control is transferred to block 309 which stops the encoding and packetization of audio information for transmission over the IP network. Next, block 311 retrieves, encodes, and transmits a TTY character from the buffer using the TTY channel. Decision block 312 determines if all of the TTY characters present in the buffer have been transferred. If the answer is no, control is transferred back to block 311. If the answer in decision block 312 is yes, control is transferred to block 313 which encodes and transmits a TTY character being received directly from the TTY terminal without being buffered in the buffer. Decision block 314 determines if voice has been detected in the input. If the answer is no, control is transferred to decision block 316 that determines if the call has been terminated. If the answer is no, control is transferred back to block 313. If the answer is yes in decision block 316, control is transferred back to decision block 301.

If voice is detected by either decision block 306 or decision block 314, control is transferred to block 401 of FIG. 4. Block 401 stops the encoding of TTY characters. This means that the operations that transmit TTY characters via the TTY channel cease. Block 402 then retrieves, encodes, and packetizes the audio information for transmission via the voice channel from the buffer using voice acceleration. The techniques for accelerating the playing of the voice information are well known by those skilled in the art. After execution of block 402, decision block 403 determines if the buffer is empty. If the buffer is not empty, control is returned to block 402. If the buffer is empty, control is transferred to block 404 which begins to encode and packetize audio information being directly received from the handset or a speaker phone (not shown) for transmission via the voice channel. Decision block 406 determines if TTY tones have been detected. If the answer is yes, control is transferred to block 309 of FIG. 3. If the answer in decision block 406 is no, decision block 407 determines if the call has been terminated. If the call has not been terminated, control is transferred back to block 404. If the call has been terminated, decision block 407 transfers control back to decision block 301 of FIG. 1.

Returning to decision block 301, if an incoming call is detected, control is transferred to decision block 408 of FIG. 4. Decision block 408 determines if audio information is being transmitted as part of the incoming call. This detection is easy to perform since the TTY characters will be transmitted via the TTY channel that is distinct in operation from the voice channel used for encoded voice information. The establishment of these two channels is well known by those skilled in the art. If audio has been detected, control is transferred to block 409 which decodes and sends this audio information to the handset or to a speaker phone if a speaker phone is being utilized by the user. After execution of block 409, control is transferred to decision block 413 that determines if the call has been terminated. If the call has not been terminated, control is transferred back to decision block 408. If the call has been terminated, decision block 413 transfers control back to decision block 301 of FIG. 1.

Returning to decision block 408, if the answer in decision block 408 is no, decision block 411 determines if TTY characters are being received in the TTY channel. If the answer is no in decision block 411, control is transferred to decision block 413. If the answer is yes in decision block 411, control is transferred to block 412 which transmits the received TTY character to the TTY terminal before transferring control to decision block 413.

Figure 5:
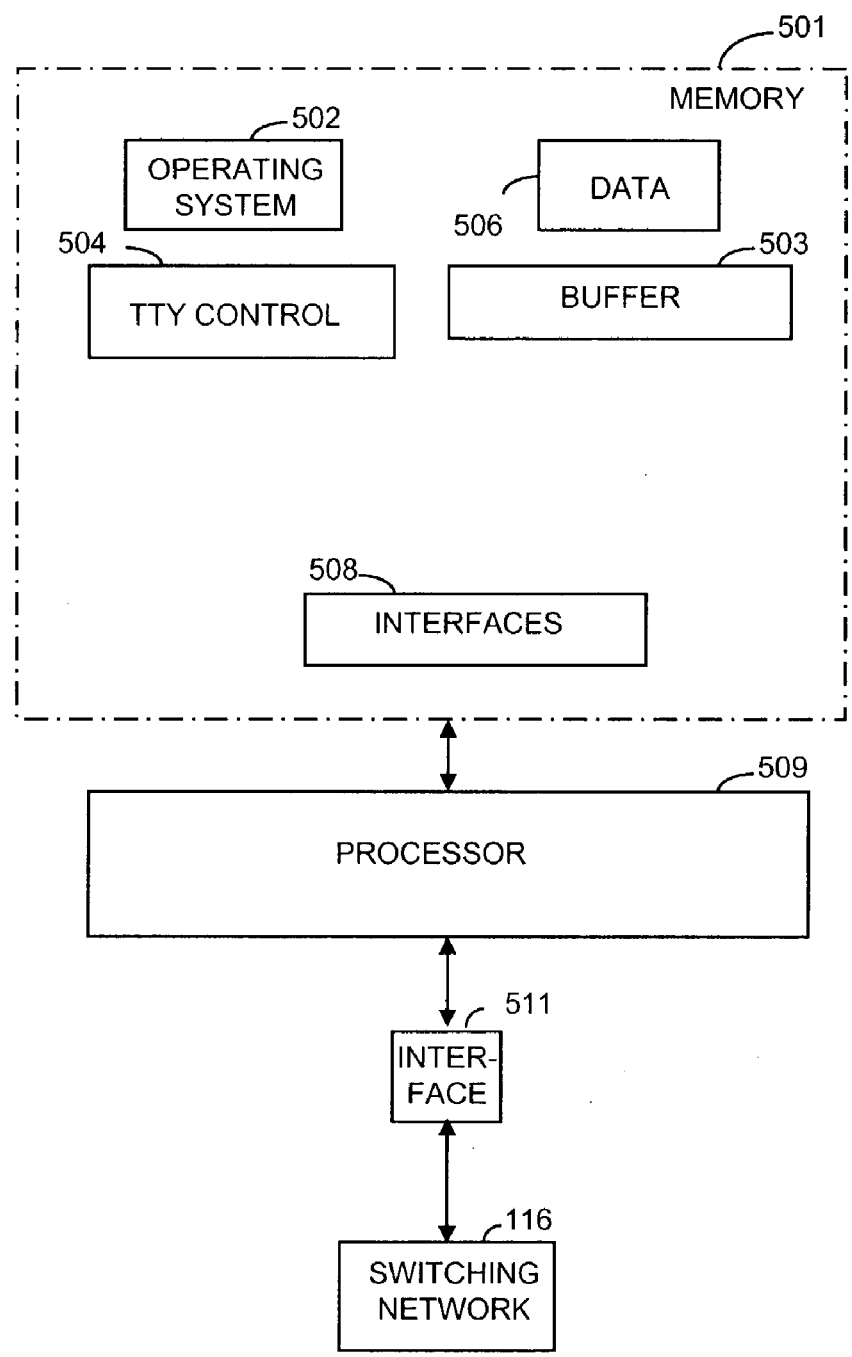
FIG. 5 illustrates, block diagram form, an embodiment of a controller for implementing the invention.

FIG. 5 illustrates, in block diagram form, TTY controller 106 of FIG. 1. Processor 509 under control of operating system 502 executes TTY control application 504 to perform the operations illustrated in the embodiment of FIGS. 6 and 7. Processor 509 utilizes buffer 503 to store either audio or TTY characters before a transition occurs between voice and TTY characters. Processor 509 utilizes data block 506 for the storage of various parameters and other information. Interfaces 508 allow the interfacing to interface 511 which interconnects TTY controller 106 to switching network 116 utilizing techniques well understood by those skilled in the art.

Figure 6:
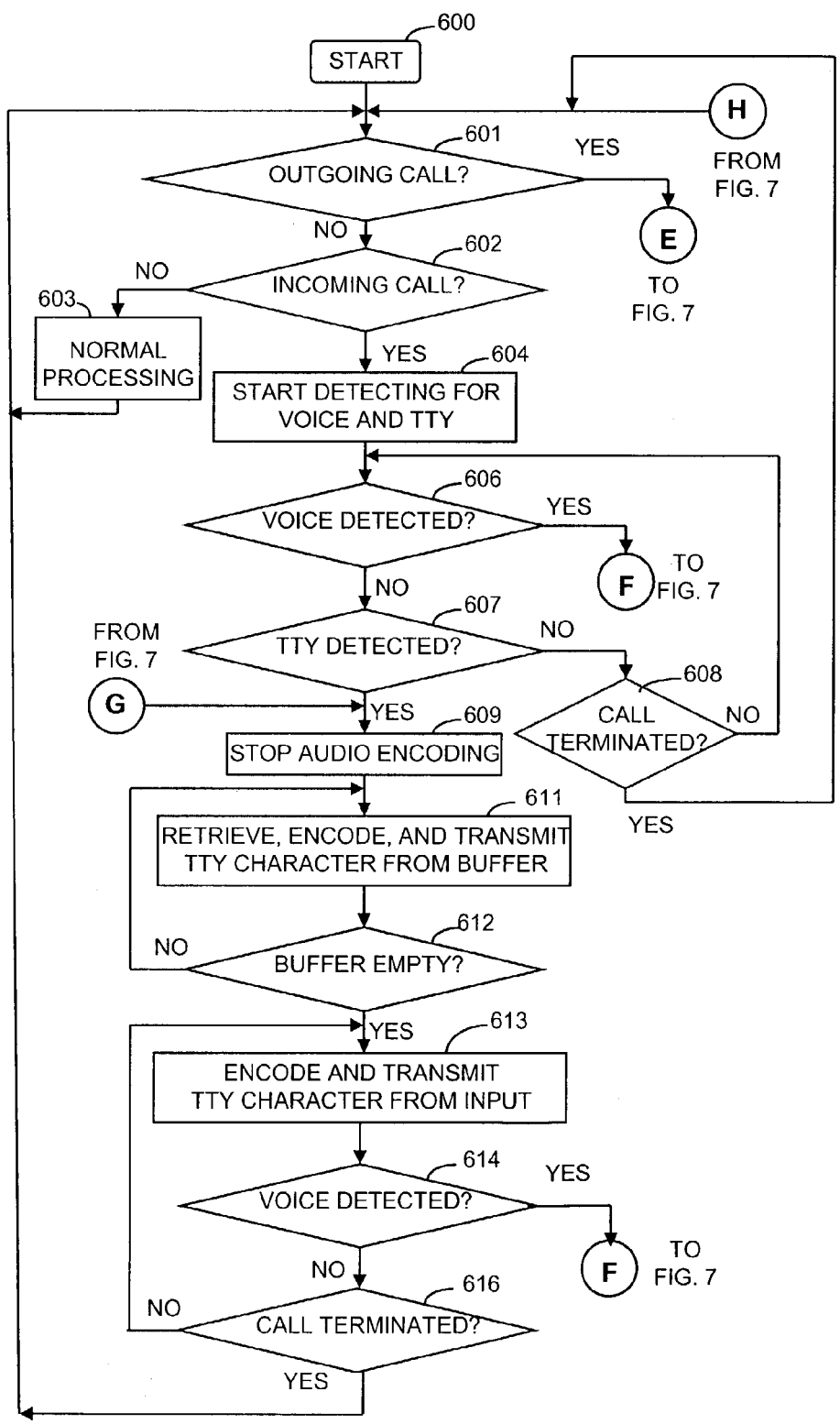
FIGS. 6 and 7 illustrate, in flowchart form, operations performed by an embodiment of the invention.
Figure 7:
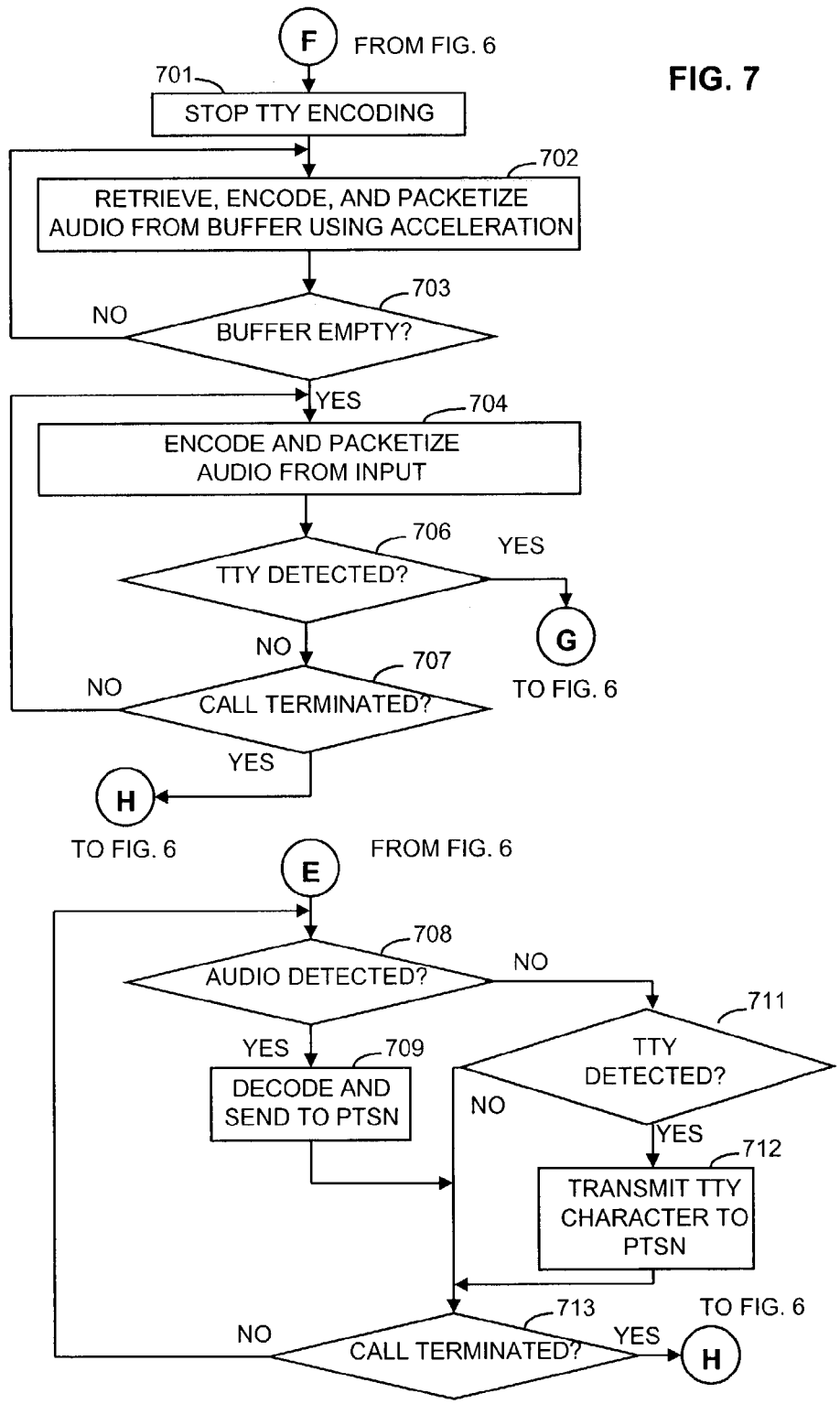

FIGS. 6 and 7 illustrate, in flowchart form, operations performed by embodiments of the invention. The operations illustrated in FIGS. 6 and 7 may be performed by processor 509 executing TTY control application 504 of FIG. 5. Once started in block 600, decision blocks 601 and 602 determine if there is an active call. If there is no active call, block 603 performs normal processing before causing the check for an active call to be repeated. Decision block 601 determines if an outgoing call being placed by an IP telephone such as IP telephone 103. If the answer is yes, control is transferred to block 708 of FIG. 7. If the answer is no in decision block 601, decision block 602 determines if an incoming call is being received from public telephone switching network 108. If the answer is no, control is transferred to block 603.

If the answer in decision block 602 is yes, block 604 starts the detection for voice and TTY information being transmitted on the outgoing call. Decision block 606 determines if audio activity other than TTY tones has been detected. (For simplicity in FIGS. 6 and 7 this is referred to as voice but those skilled in the art will readily realize that other audio information could also be present, e.g. music.) If the answer in decision block 606 is yes, control is transferred to block 701 of FIG. 7. If the answer in decision block 606 is no, decision block 607 determines if any TTY tones are being detected. If the answer is no, decision block 608 determines if the call has been terminated. If the call has not been terminated, decision block 608 returns control back to decision block 606. If the call has been terminated, decision block 608 transfers control back to decision block 601.

If the answer in decision block 607 is yes, control is transferred to block 609 which stops the encoding and packetization of audio information for transmission over the IP network via the voice channel. Next, block 611 retrieves, encodes, and transmits a TTY character from the buffer. Decision block 612 determines if all of the TTY characters present in the buffer have been transferred. If the answer is no, control is transferred back to block 611. If the answer in decision block 612 is yes, control is transferred to block 613 which encodes and transmits a TTY character being received (via switching network 116, IP trunk 119, LAN 102, and the IP telephone on the TTY channel) from the TTY terminal without being buffered in the buffer. Decision block 614 determines if voice has been detected in the input. If the answer is no, control is transferred to decision block 616 that determines if the call has been terminated. If the answer is no, control is transferred back to block 613. If the answer is yes in decision block 616, control is transferred back to decision block 601.

If voice is detected by either decision block 606 or decision block 614, control is transferred to block 701 of FIG. 7. Block 701 stops the encoding of TTY characters. This means that the operations that transmit TTY characters via the TTY channel cease. Block 702 then retrieves, encodes, and packetizes the audio information from the buffer using voice acceleration for transmission via the voice channel. The techniques for accelerating the playing of the voice information are well known by those skilled in the art. After execution of block 702, decision block 703 determines if the buffer is empty. If the buffer is not empty, control is returned to block 702. If the buffer is empty, control is transferred to block 704 which begins to encode and packetize audio information being received (via switching network 116, IP trunk 119, LAN 102, and the IP telephone) from the handset or a speaker phone (not shown). Decision block 706 determines if TTY tones have been detected. If the answer is yes, control is transferred to block 609 of FIG. 6. If the answer in decision block 706 is no, decision block 707 determines if the call has been terminated. If the call has not been terminated, control is transferred back to block 704. If the call has been terminated, decision block 707 transfers control back to decision block 601 of FIG. 1.

Returning to decision block 601, if an incoming call is detected, control is transferred to decision block 708 of FIG. 7. Decision block 708 determines if audio information is being transmitted as part of the incoming call. This detection is easy to perform since the TTY characters will be transmitted in the TTY channel distinct in operations from the voice channel used for encoded voice information. The establishment of these channels is well known by those skilled in the art. If audio has been detected, control is transferred to block 709 which decodes and sends this audio information to public telephone switching system 108. After execution of block 709, control is transferred to decision block 713 that determines if the call has been terminated. If the call has not been terminated, control is transferred back to decision block 708. If the call has been terminated, decision block 713 transfers control back to decision block 601 of FIG. 1.

Returning to decision block 708, if the answer in decision block 708 is no, decision block 711 determines if TTY characters are being received in the TTY channel. If the answer is no in decision block 711, control is transferred to decision block 713. If the answer is yes in decision block 711, control is transferred to block 712 which transmits the received TTY character to public telephone switching system 108 before transferring control to decision block 713.

As previously discussed, control computer 128 provides the overall control of enterprise switching system 101. Most of this control is performed by control application 126 in conjunction with operating system 124 upon being executed by processor 123. Also stored, in memory 122 is a variety of data, which is not illustrated, that is utilized to perform call processing functions as well known to those skilled in the art. TTY ID equipment data 127 is utilized by processor 123 under control of control application 126 to identify IP telephones such as IP telephone 103 that are either marked by a system administrator as potentially using a TTY terminal or incoming calls previously containing TTY information have been placed to such an IP telephone. TTY ID incoming numbers data 128 is information that defines telephones and other equipment interconnected to PTSN 108 that have been determined to transmit TTY characters. This information may be gleamed in one embodiment by utilizing publicly available lists of "800" numbers for TTY information and also by identifying numbers terminating on PTSN 108 to which IP telephones listed in TTY ID equipment data 126 have placed calls. The reason that data 127 and 128 are utilized is because it is not desirable to place TTY controller 106 in the path of every call that is interconnected from enterprise switching system 101 to PTSN 108. Although in one embodiment of the invention this is done. Another embodiment of the invention that utilizes data 127 and 128 is illustrated in flowchart form in FIG. 8.

Figure 8:
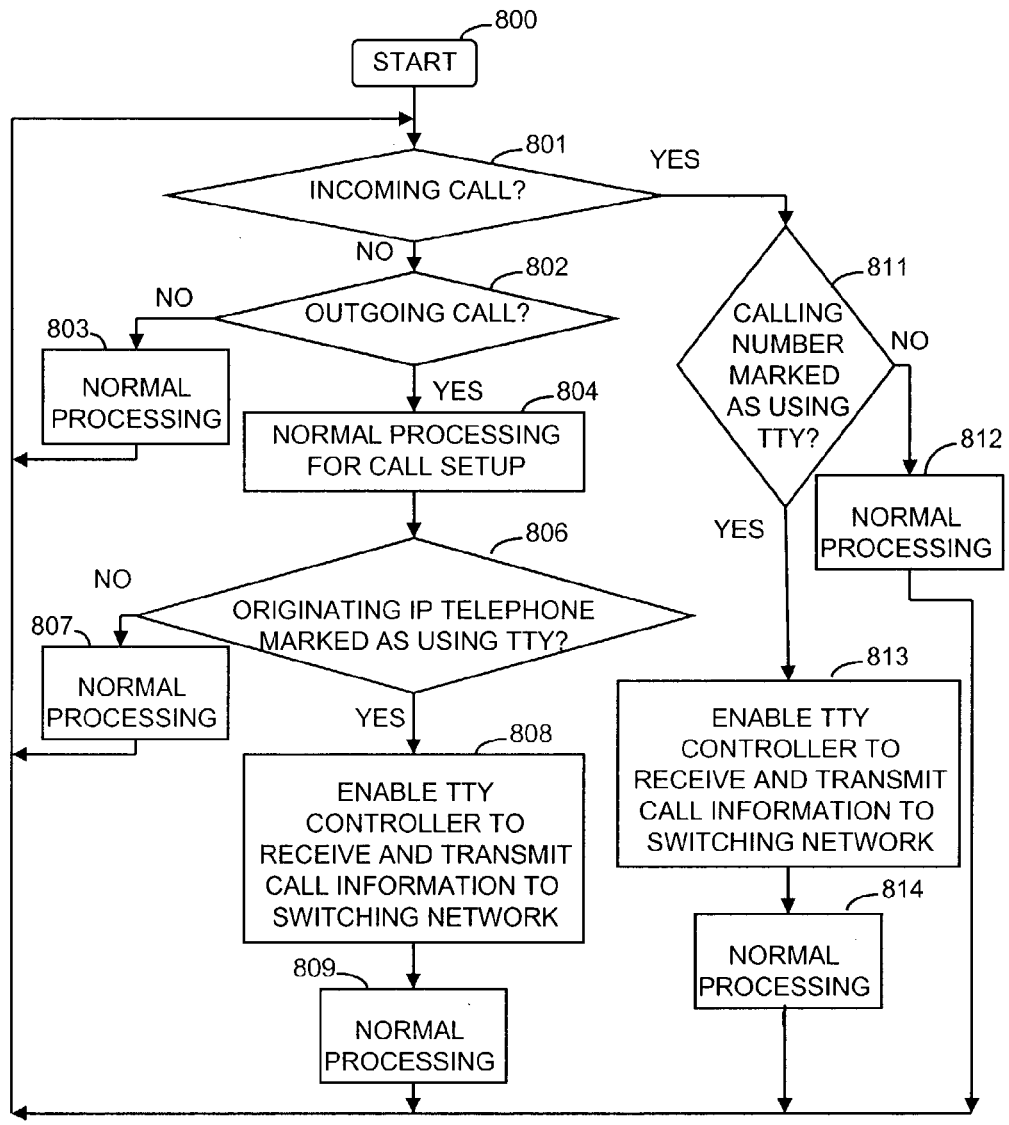
FIG. 8 illustrates, in flowchart form, operations performed by an embodiment of a switching system.

FIG. 8 illustrates an embodiment of the operations of control computer 128 in flowchart form. After being started in block 800, decision block 801 determines if there is an incoming call. If the answer is no, control is transferred to decision block 802 which determines if there is an outgoing call from enterprise switching system 101. If the answer is no, control is transferred to block 803 which performs normal call processing operations before returning control to decision block 801.

If the answer in decision block 801 is yes, that there is an incoming call, control is transferred to decision block 811 which determines from data 128 of FIG. 1 if the originating telephone placing the incoming call is marked as using TTY. In addition, decision block 811 determines if the IP telephone to which the call is directed is marked in data 127 as utilizing TTY transmission. If the answer in decision block 811 is no, control is transferred to block 812 which performs normal processing before transferring control back to decision block 801. If the answer in decision block 811 is yes, block 813 enables TTY controller 106 to be placed in the call information path by the proper initialization of switching network 116 as is well known to those skilled in the art. After execution of block 813, block 814 performs normal processing which includes the determination of when the call is abandoned before transferring control back to decision block 801.

Returning to decision block 801, if the answer is no and decision block 802 determines it is an outgoing call, block 804 first performs normal processing for call setup. Decision block 806 determines if the originating IP telephone is marked as using TTY in data 127 as well as determining if the destination telephone is marked as utilizing TTY transmission in data 128. If this determination is yes in decision block 806, block 808 enables TTY controller to receive and transmits call information as part of the originating call via switching network 116. Finally, block 809 performs normal call processing before transferring control back to decision block 801.

Figure 9:
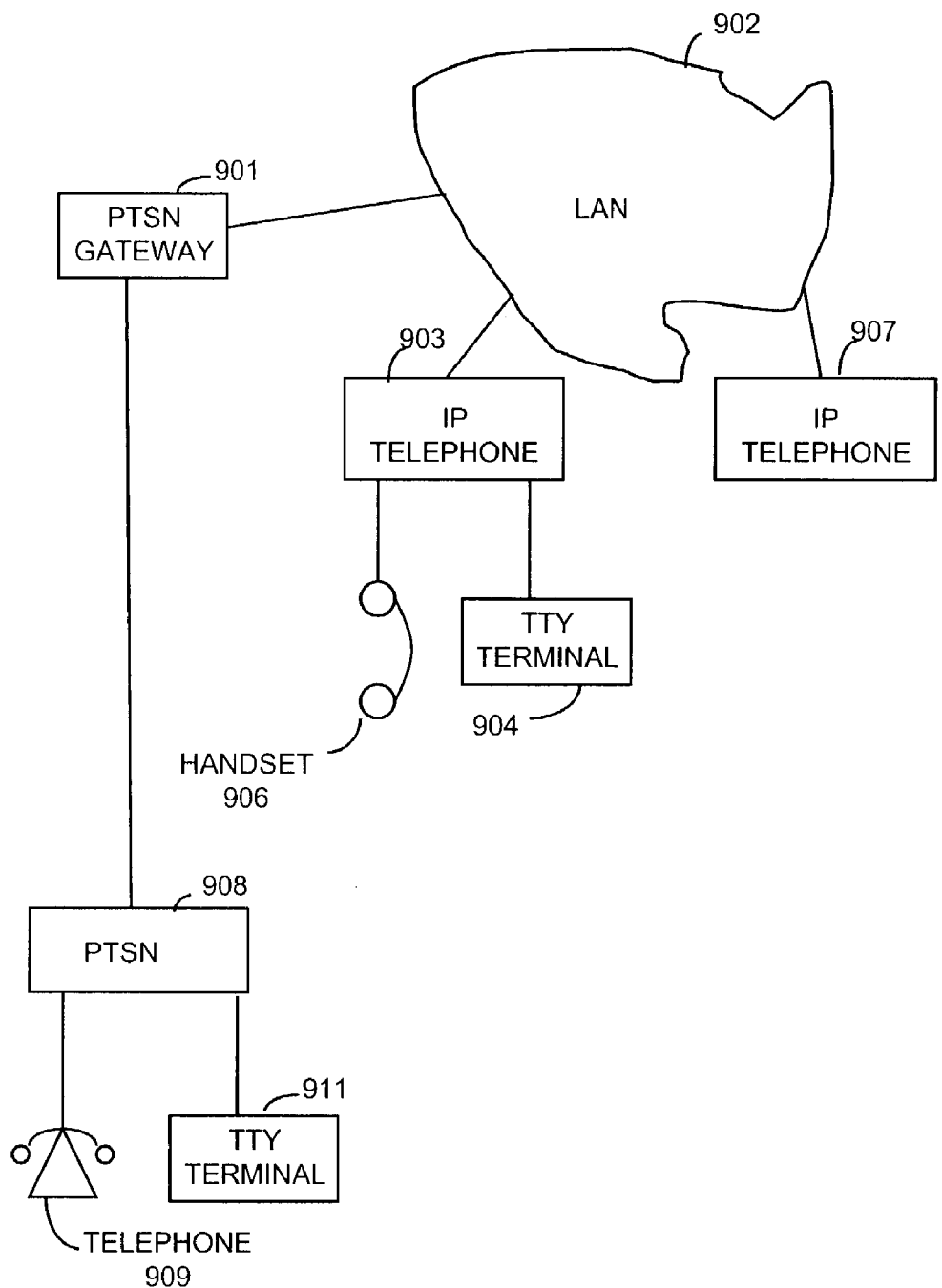
FIG. 9 illustrates an embodiment of another system for implementing the invention.

FIG. 9 illustrates another embodiment of a system for implementing the invention. The system of FIG. 9 illustrates a telecommunication system based on only the IP protocol for communicating voice information. All communication is done via LAN 902 which may also be a WAN or other digital networks well known to those skilled in the art. PTSN gateway 901 is a unit that provides interconnection from LAN 902 to public telephone switching network 908. For illustration purposes, telephone 901 and TTY terminal 911 are illustrated as being connected to public telephone switching network 908. The functions normally performed by PTSN gateway 901 are well understood by those skilled in the art. An embodiment of PTSN gateway 901 in accordance with the invention allows for the proper transition between voice and TTY transmission that is either being transmitted to public telephone switching network 908 or received from public telephone switching network 908. Interconnected to LAN 902, for illustrative purposes, also are IP telephone 907 and IP telephone 903. IP telephone 903 has connected to it handset 906 and TTY terminal 904.

Figure 10:
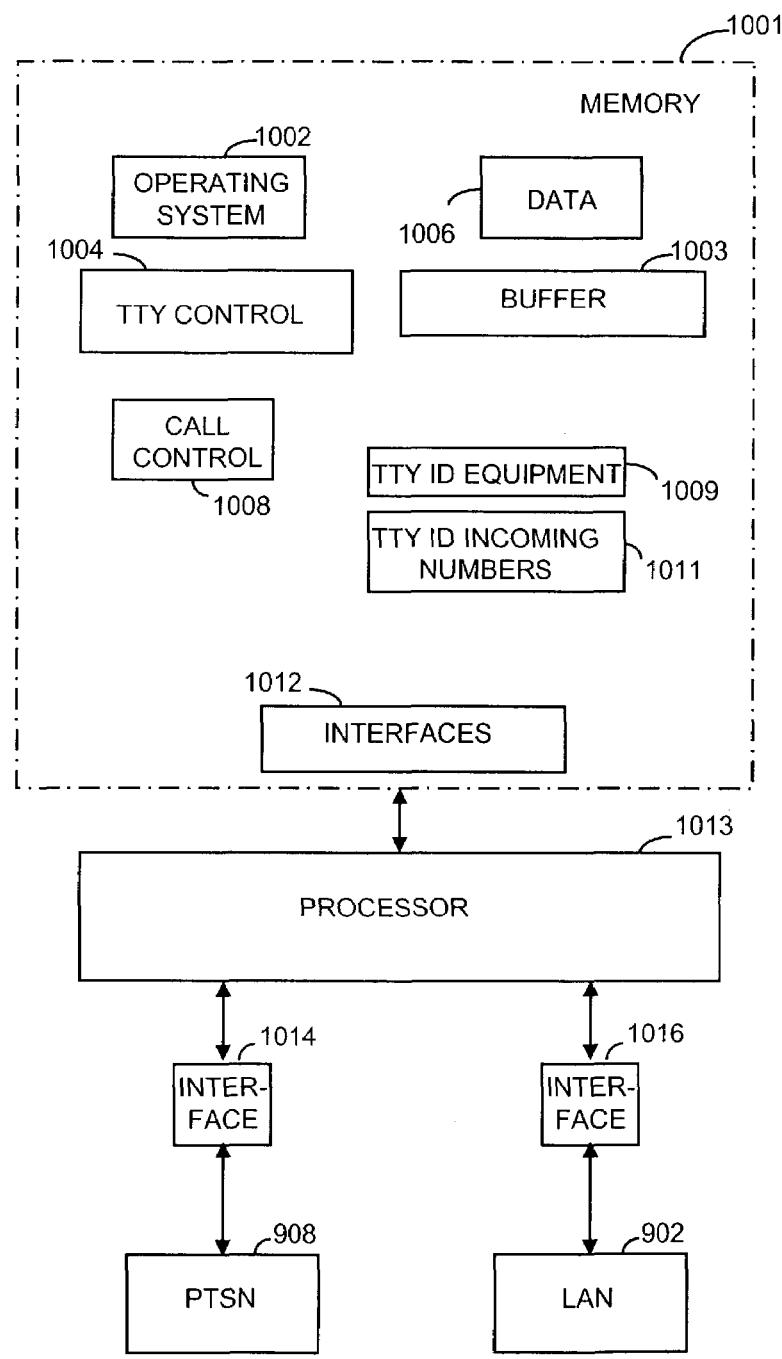
FIG. 10 illustrates, in block diagram form, an embodiment of a PTSN gateway for implementing an embodiment of the invention.

FIG. 10 illustrates, in block diagram form, PTSN gateway 901 FIG. 10 in greater detail. Processor 1013 under control of operating system 1002 executes TTY control application 1004 and call control 1008 to perform the operations illustrated in the embodiment of FIGS. 11–13. Processor 1013 utilizes buffer 1003 to store either audio or TTY characters before a transition occurs between voice and TTY characters. Processor 1013 utilizes data block 1006 for the storage of various parameters and other information. TTY ID equipment data 1009 is utilized by processor 1013 under control of call control application 1008 and TTY control application 1004 to identify IP telephones such as IP telephone 909 that are either marked by a system administrator as potentially using a TTY terminal or incoming calls previously containing TTY information have been placed to an IP telephone that uses TTY information connected to LAN 902. TTY ID incoming numbers data 1011 is information that defines telephones and other equipment interconnected to PTSN 902 that have been determined to transmit TTY characters. This information may be gleamed in one embodiment by utilizing publicly available lists of "800" numbers for TTY information and also by identifying numbers terminating on PTSN 902 to which IP telephones listed in TTY ID equipment data 1009 have placed calls. The reason that data 1009 and 1011 are utilized is because it is not desirable to use the TTY functions of PTSN gateway 901 for every call that is interconnected from LAN 902 to PTSN 902. Although in one embodiment of the invention this is done. Another embodiment of the invention that utilizes data 1009 and 1011 is illustrated in flowchart form in FIGS. 11–13. Interfaces 1012 allow the interfacing to interface 1016 which interconnects PTSN gateway 901 to LAN 902. Also, interfaces 1012 allow the interfacing to interface 1014 which interconnects PTSN gateway 901 to LAN 902 also utilizing techniques well understood by those skilled in the art.

Figure 11:
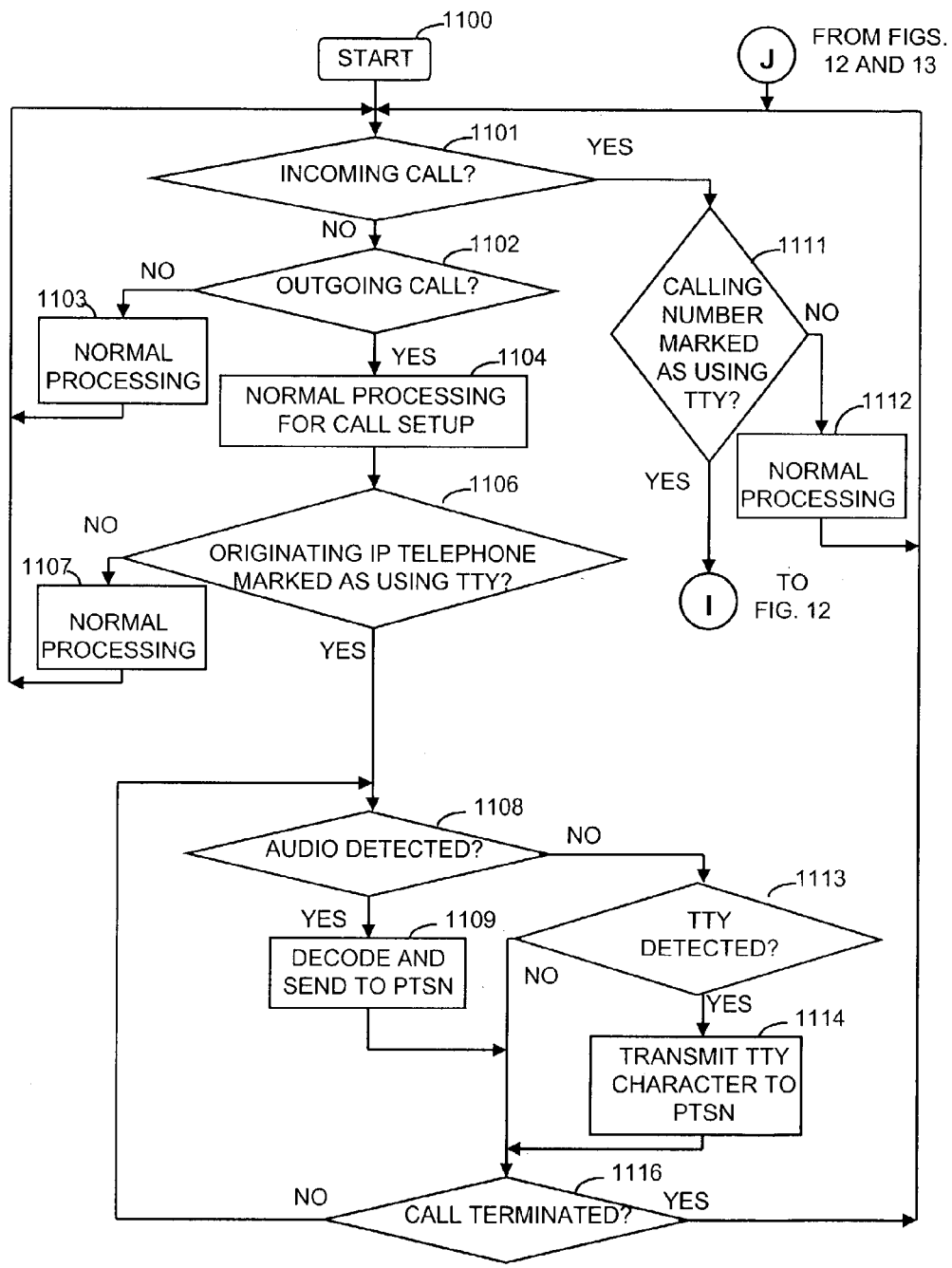
FIGS. 11–13 illustrate, in flowchart form, operations performed by another embodiment of the invention.
Figure 12:
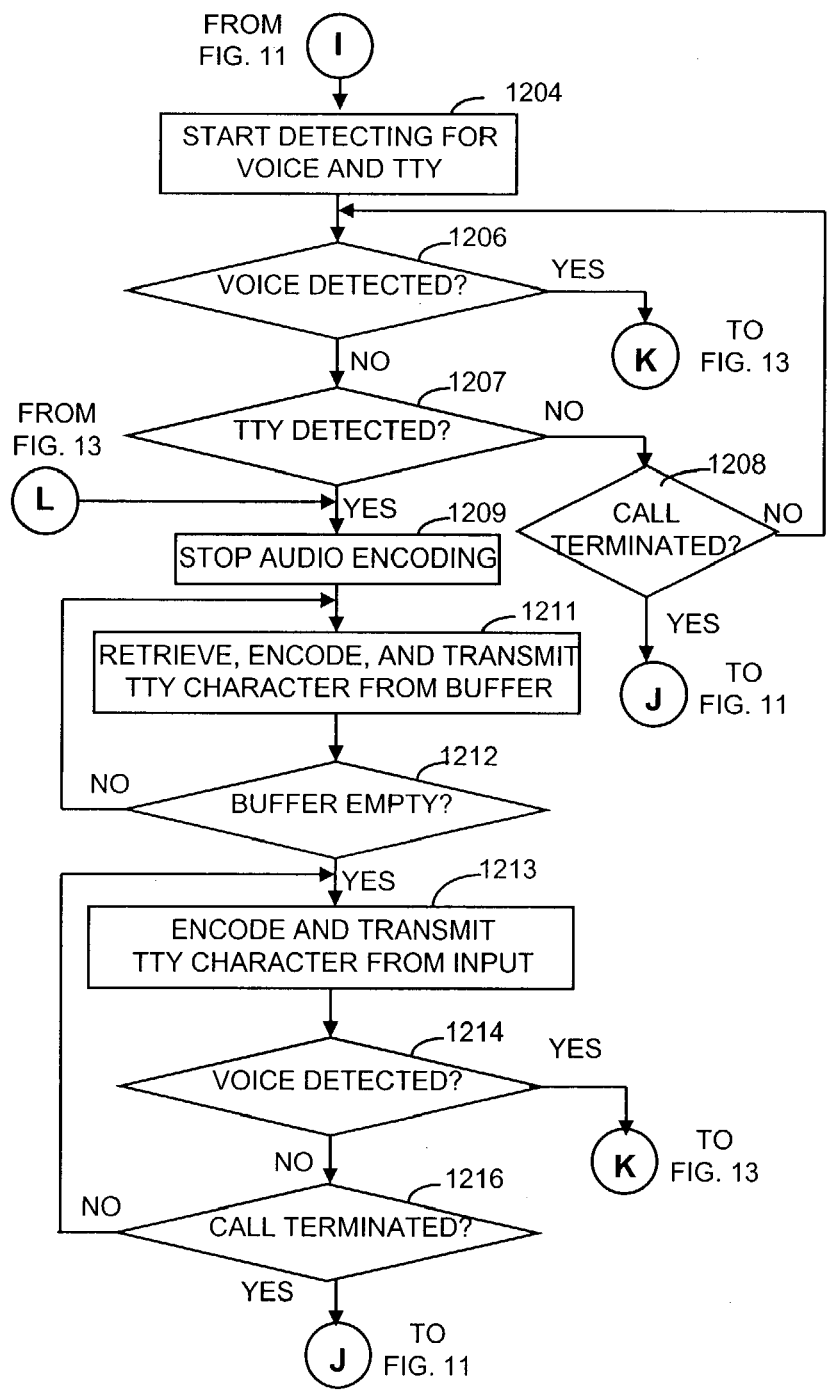
Figure 13:
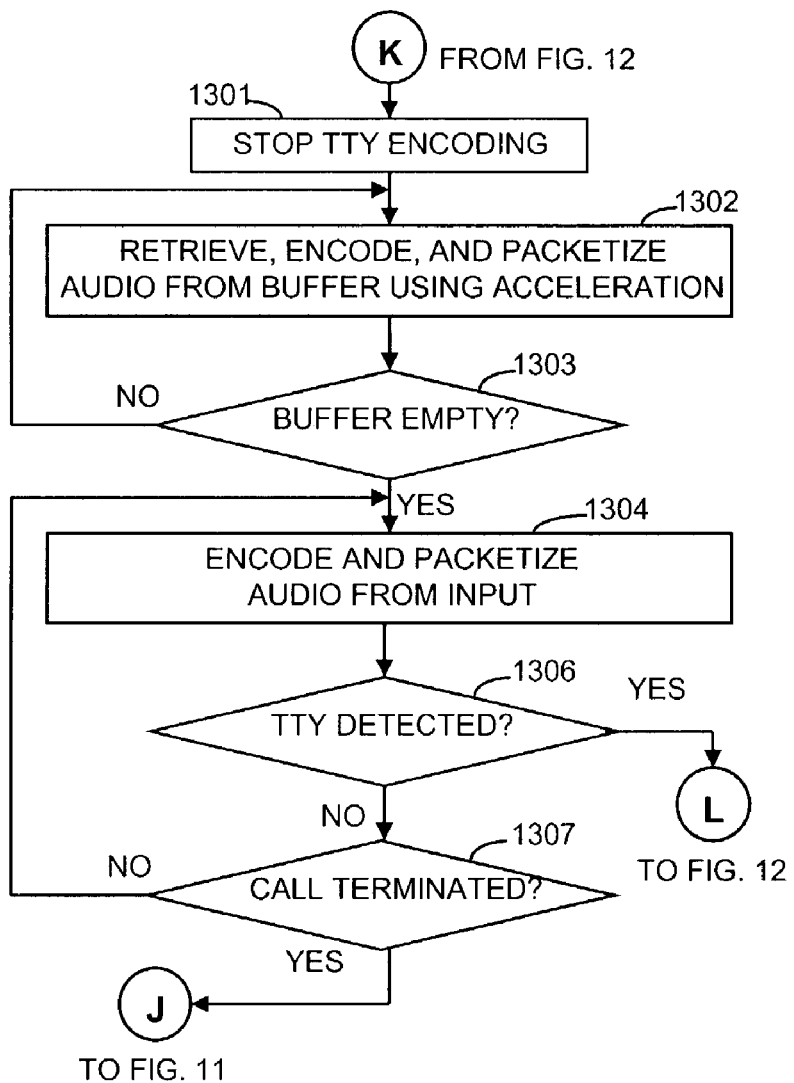

FIGS. 11–13 illustrate an embodiment of the operations of processor 1013 of FIG. 10 in flowchart form. After being started in block 1100, decision block 1101 determines if there is an incoming call from public telephone switching network 908. If the answer is no, control is transferred to decision block 1102 which determines if there is an outgoing call to public telephone switching network 908 from LAN 902 being placed by an IP telephone connected to LAN 902. If the answer is no, control is transferred to block 1103 which performs normal call processing operations before returning control to decision block 1101.

If the answer in decision block 1101 is yes, that there is an incoming call, control is transferred to decision block 1111 which determines from data 1011 of FIG. 1 if the originating telephone placing the incoming call is marked as using TTY. In addition, decision block 1111 determines if the IP telephone to which the call is directed is marked in data 1009 as utilizing TTY transmission. If the answer in decision block 1111 is no, control is transferred to block 1112 which performs normal processing before transferring control back to decision block 1101. If the answer in decision block 1111 is yes, control is transferred to block 1204 of FIG. 12.

Block 1204 starts the detection for voice and TTY information being received on the incoming call. Decision block 1206 determines if audio activity other than TTY tones has been detected. (For simplicity in FIGS. 12 and 13 this is referred to as voice but those skilled in the art will readily realize that other audio information could also be present, e.g. music.) If the answer in decision block 1206 is yes, control is transferred to block 1301 of FIG. 13. If the answer in decision block 1206 is no, decision block 1207 determines if any TTY tones are being detected. If the answer is no, decision block 1208 determines if the call has been terminated. If the call has not been terminated, decision block 1208 returns control back to decision block 1206. If the call has been terminated, decision block 1208 transfers control back to decision block 1101 of FIG. 11.

If the answer in decision block 1207 is yes, control is transferred to block 1209 which stops the encoding and packetization of audio information for transmission over LAN 902. Next, block 1211 retrieves, encodes, and transmits a TTY character from the buffer. Decision block 1212 determines if all of the TTY characters present in the buffer have been transferred. If the answer is no, control is transferred back to block 1211. If the answer in decision block 1212 is yes, control is transferred to block 1213 which encodes and transmits a TTY character being received directly from public telephone switching network 908 without being buffered in the buffer. Decision block 1214 determines if voice has been detected in the input from public telephone switching network 908. If the answer is no, control is transferred to decision block 1216 which determines if the call has been terminated. If the answer is no, control is transferred back to block 1213. If the answer is yes in decision block 1216, control is transferred back to decision block 1101 of FIG. 11.

If voice is detected by either decision block 1206 or decision block 1214, control is transferred to block 1301 of FIG. 13. Block 1301 stops the encoding of TTY characters. This means that the operations that transmit TTY characters to LAN 902 cease. Block 1302 then retrieves, encodes, and packetizes the audio information from the buffer using voice acceleration for transmission via the voice channel. The techniques for accelerating the playing of the voice information are well known by those skilled in the art. After execution of block 1302, decision block 1303 determines if the buffer is empty. If the buffer is not empty, control is returned to block 1302. If the buffer is empty, control is transferred to block 1304 which begins to encode and packetize audio information being directly received from public telephone switching network 908. Decision block 1306 determines if TTY tones have been detected. If the answer is yes, control is transferred to block 1209 of FIG. 12. If the answer in decision block 1306 is no, decision block 1307 determines if the call has been terminated. If the call has not been terminated, control is transferred back to block 1304. If the call has been terminated, decision block 1307 transfers control back to decision block 1101 of FIG. 11.

Returning to decision block 1101, if the answer is no and decision block 1102 determines that there is an outgoing call, block 1104 first performs normal processing for call setup. Decision block 1106 determines if the originating IP telephone is marked as using TTY in data 1109 as well as determining if the destination telephone is marked as utilizing TTY transmission in data 1011. If this determination is no in decision block 1106, control is transferred to block 1107 which performs normal processing before returning control to decision block 1101. If this determination is yes in decision block 1106, control is transferred to decision block 1108.

Decision block 1108 determines if audio information is being transmitted as part of the outgoing call. This detection is easy to perform since the TTY characters will be transmitted in the TTY channel which is distinct in operation from the voice channel used for encoded voice information. The establishment of these channels is well known by those skilled in the art. If audio has been detected, control is transferred to block 1109 which decodes and sends this audio information to public telephone switching network 908. After execution of block 1109, control is transferred to decision block 1116 which determines if the call has been terminated. If the call has not been terminated, control is transferred back to decision block 1108. If the call has been terminated, decision block 1116 transfers control back to decision block 1101.

Returning to decision block 1108, if the answer in decision block 1108 is no, decision block 1113 determines if TTY characters are being received in the TTY channel. If the answer is no in decision block 1113, control is transferred to decision block 1116. If the answer is yes in decision block 1113, control is transferred to block 1114 which transmits the received TTY character to public telephone switching network 908 before transferring control to decision block 1116.

Of course, various changes and modifications to the illustrated embodiments described above would be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for controlling transitions between a plurality of types of audio information being received via an audio stream, comprising the steps of:

continuously storing the audio stream;

transmitting a present type of audio information from the audio stream;

detecting a new type of audio information in the audio stream at a point in time;

transmitting at an accelerated rate the new type of audio information from the stored audio stream until the detected time point is reached; and transmitting the new type of audio information from the audio stream after the detected time point is reached in the stored audio stream.

2. The method of claim 1 wherein the step of transmitting the present type of audio comprises the step of using a first type of transmission; and the step of transmitting at the accelerated rate comprises the step of using a second type of transmission.

3. The method of claim 2 wherein the second type of transmission is a digital control link.

4. The method of claim 2 wherein the second type of transmission is a packet transmission protocol of higher quality than a packet protocol of the first type of transmission.

5. The method of claim 2 wherein the first type of transmission is a digital control link.

6. The method of claim 2 wherein the first type of transmission is a packet transmission protocol of higher quality than a packet protocol of the second type of transmission.

7. The method of claim 1 wherein the present type of audio information is one of packetized voice or TDD information.

8. The method of claim 1 wherein the new type of audio information is one of packetized voice or TDD information.

9. The method of claim 1 further comprises the step of determining whether to perform the steps of continuously storing the audio stream, detecting the new type of audio information, transmitting at the accelerated rate, and transmitting the new type of audio information.

10. The method of claim 9 wherein the step of determining comprises accessing data to determine if a source of the audio stream uses both the first and second types of audio information.

11. The method of claim 9 wherein the step of determining comprises accessing data to determine if a destination of the audio stream uses both the first and second types of audio information.

12. A method of communicating both voice and TDD information in audio information of telecommunication calls, comprising the steps of:

determining by a telecommunication system that both voice and TDD information may be present on an incoming telecommunication call to the telecommunication system by accessing data for an originating telecommunication unit of an incoming telecommunication call to a telecommunication system, and identifying if the originating telecommunication unit is marked as using TDD information; and providing for transitions between voice and TDD information on the telecommunication call upon the determination being made that both voice and TDD information may be present on the telecommunication call.

13. The method of claim 12 wherein the step of determining further comprises assembling the data based on published TDD telecommunication numbers.

14. The method of claim 12 wherein the step of determining further comprises assembling the data based on telecommunication units known to use TDD information connected to the telecommunication system having placed telecommunication calls to telecommunication units identified in the data.

15. A method for performing transitions between voice information and TDD information in an audio stream, comprising the steps of:

continuously storing the audio stream;
transmitting voice information from the audio stream upon voice information having been present;
detecting TDD information in the audio stream at a point in time;
transmitting at an accelerated rate TDD information from the stored audio stream until the detected time point is reached; and
transmitting TDD information from the audio stream after the detected time point is reached in the stored audio stream.

16. The method of claim 15 further comprises the step of determining a start of the TDD information in the stored audio stream.

17. The method of claim 16 further comprises the steps of transmitting TDD from the audio stream upon TDD having been present;
detecting voice information in the audio stream at a second point in time;
transmitting at an accelerated rate voice information from the stored audio stream until the detected second time point is reached; and
transmitting voice information from the audio stream after the detected second time point is reached in the stored audio stream.

18. The method of claim 17 further comprises the step of determining a start of the voice information in the stored audio stream.

19. The method of claim 16 wherein the step of transmitting the voice information comprises the step of using a first type of transmission; and the step of transmitting at the accelerated rate comprises the step of using a second type of transmission.

20. The method of claim 19 wherein the second type of transmission is a digital control link.

21. The method of claim 19 wherein the second type of transmission is a packet transmission protocol of higher quality than a packet protocol of the first type of transmission.

22. The method of claim 15 further comprises the step of determining whether to perform the steps of continuously storing the audio stream, detecting the TDD information, transmitting at the accelerated rate, and transmitting the TDD information.

23. The method of claim 22 wherein the step of determining comprises accessing data to determine if a source of the audio stream uses both the voice and TDD audio information.

24. The method of claim 22 wherein the step of determining comprises accessing data to determine if a destination of the audio stream uses both the voice and TDD audio information.

25. A processor-readable medium comprising processor-executable instructions stored in a device configured for:

continuously storing the audio stream;
transmitting a present type of audio information from the audio stream;
detecting a new type of audio information in the audio stream at a point in time;
transmitting at an accelerated rate the new type of audio information from the stored audio stream until the detected time point is reached; and
transmitting the new type of audio information from the audio stream after the detected time point is reached in the stored audio stream.

26. The processor-readable medium of claim 25 wherein the transmitting the present type of audio comprises using a first type of transmission; and the transmitting at the accelerated rate comprises using a second type of transmission.

27. The processor-readable medium of claim 26 wherein the second type of transmission is a digital control link.

28. The processor-readable medium of claim 26 wherein the second type of transmission is a packet transmission protocol of higher quality than a packet protocol of the first type of transmission.

29. The processor-readable medium of claim 26 wherein the first type of transmission is a digital control link.

30. The processor-readable medium of claim 26 wherein the first type of transmission is a packet transmission protocol of higher quality than a packet protocol of the second type of transmission.

31. The processor-readable medium of claim 25 wherein the present type of audio information is one of packetized voice or TDD information.

32. The processor-readable medium of claim 25 wherein the new type of audio information is one of packetized voice or TDD information.

33. The processor-readable medium of claim 25 further comprises determining whether to perform the continuously storing the audio stream, detecting the new type of audio information, transmitting at the accelerated rate, and transmitting the new type of audio information.

34. The processor-readable medium of claim 33 wherein the determining comprises accessing data to determine if a source of the audio stream uses both the first and second types of audio information.

35. The processor-readable medium of claim 33 wherein the determining comprises accessing data to determine if a destination of the audio stream uses both the first and second types of audio information.

36. A processor-readable medium comprising processor-executable instructions stored in a telecommunication system configured for:
   determining by the telecommunication system that both voice and TDD information may be present on an incoming telecommunication call to the telecommunication system by accessing data for an originating telecommunication unit of an incoming telecommunication call to a telecommunication system, and identifying if the originating telecommunication unit is marked as using TDD information; and
   providing for transitions between voice and TDD information on the telecommunication call upon the determination being made that both voice and TDD information may be present on the telecommunication call.

37. The processor-readable medium of claim 36 wherein the determining further comprises assembling the data based on published TDD telecommunication numbers.

38. The processor-readable medium of claim 36 wherein the determining further comprises assembling the data based on telecommunication units known to use TDD information connected to the telecommunication system having placed telecommunication calls to telecommunication units identified in the data.

39. A processor-readable medium comprising processor-executable instructions stored in a device configured for:
   continuously storing the audio stream;
   transmitting voice information from the audio stream upon voice information having been present;
   detecting TDD information in the audio stream at a point in time;
   transmitting at an accelerated rate TDD information from the stored audio stream until the detected time point is reached; and
   transmitting TDD information from the audio stream after the detected time point is reached in the stored audio stream.

40. The processor-readable medium of claim 39 further comprises determining a start of the TDD information in the stored audio stream.

41. The processor-readable medium of claim 40 further comprises transmitting TDD from the audio stream upon TDD having been present;
   detecting voice information in the audio stream at a second point in time;
   transmitting at an accelerated rate voice information from the stored audio stream until the detected second time point is reached; and
   transmitting voice information from the audio stream after the detected second time point is reached in the stored audio stream.

42. The processor-readable medium of claim 41 further comprises determining a start of the voice information in the stored audio stream.

43. The processor-readable medium of claim 40 wherein the transmitting the voice information comprises using a first type of transmission; and
   the transmitting at the accelerated rate comprises using a second type of transmission.

44. The processor-readable medium of claim 43 wherein the second type of transmission is a digital control link.

45. The processor-readable medium of claim 43 wherein the second type of transmission is a packet transmission protocol of higher quality than a packet protocol of the first type of transmission.

46. The processor-readable medium of claim 39 further comprises determining whether to perform the continuously storing the audio stream, detecting the TDD information, transmitting at the accelerated rate, and transmitting the TDD information.

47. The processor-readable medium of claim 46 wherein the determining comprises accessing data to determine if a source of the audio stream uses both the voice and TDD audio information.

48. The processor-readable medium of claim 46 wherein the determining comprises accessing data to determine if a destination of the audio stream uses both the voice and TDD audio information.

* * * * *